J. M. MARK.
MOLDING APPARATUS.
APPLICATION FILED AUG. 30, 1919.

1,329,621. Patented Feb. 3, 1920.

James M. Mark
By Jas. H. Cary
Attorney.

UNITED STATES PATENT OFFICE.

JAMES M. MARK, OF OREGON CITY, OREGON.

MOLDING APPARATUS.

1,329,621.  Specification of Letters Patent.  Patented Feb. 3, 1920.

Application filed August 30, 1919. Serial No. 320,903.

*To all whom it may concern:*

Be it known that I, JAMES M. MARK, a citizen of the United States, residing at Oregon City, in the county of Clackamas and State of Oregon, have invented certain new and useful Improvements in Molding Apparatus, of which the following is a specification.

My invention relates to molds especially adapted for making cast metal beveled flanges or filler rings. It often happens when installing flanged piping that it is desirable to run the pipe at odd angles which do not conform to any of the standard fittings and therefore a special filler piece has to be made to fill up the gap or space between the abutting flanges, which are at a slight acute angle to each other, instead of having their faces in the same plane. This filler piece is commonly called a "dutchman". Ordinarily a special mold has to be made and a lead casting poured and machined before the work can proceed. My device provides a handy means of doing this quickly, without any appreciable loss of time and consists in the novel and advantageous construction hereinafter pointed out and described.

Figure 1:
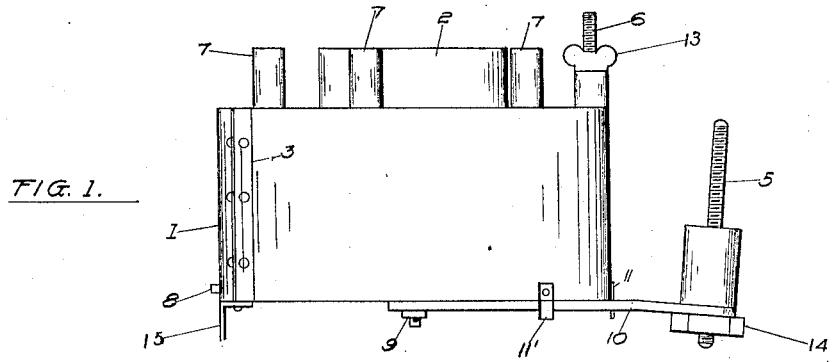
Figure 2:
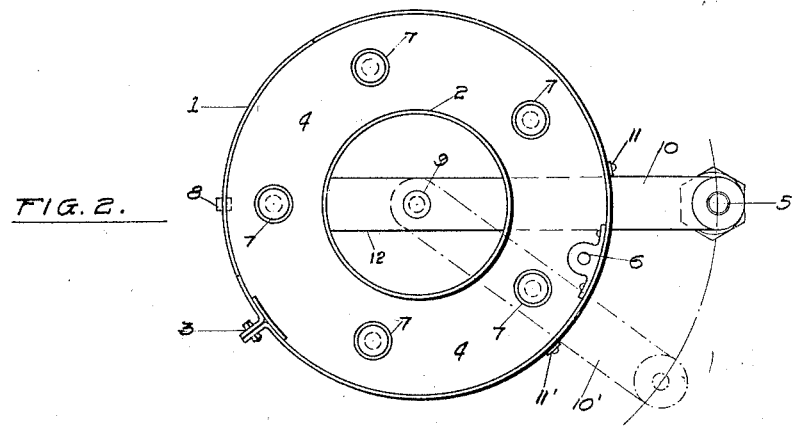
Figure 3:
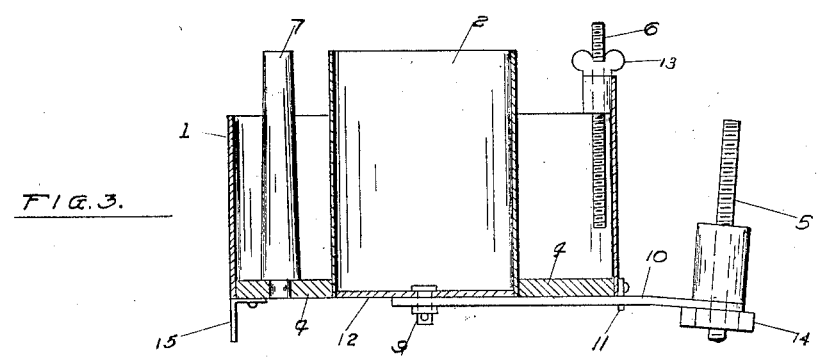
Figure 4:
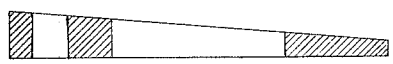

Figure 1 is a side elevation. Fig. 2 is a plan. Fig. 3 is a cross section of side elevation 1. Fig. 4 is a section showing a cast beveled flange.

The cast iron base part 4 has a central opening of the same diameter as the size of the pipe to be fitted and whose outer diameter is the same as the outside diameter of the pipe flanges between which the beveled filler piece is to be placed. On the outside of this bottom part 4 is clamped and bolted a metal rim 1 of galvanized iron several inches deep, the pin 8, Figs. 1 and 2, preventing this rim from shifting. An inner rim 2 of galvanized iron is also firmly fitted to the central opening in 4 and a central bar 12, Figs. 2 and 3, spans the space across the bottom edge of 2. The steel pins 7, 7, 7, 7, 7, Fig. 2, are set vertically in the base part 4, spaced on the appropriate bolt circle to correspond to the bolt circle of the flanges between which the cast beveled flange or filler ring is to fit. The pins 7 are tapered as shown and are slightly larger in diameter than the bolts to be used, so that the resulting bolt holes will allow the bolts to pass freely through the cast beveled flange without any further machine work or drilling. A gage screw 6, with lock nut 13, is used to indicate the height to which the molten metal should be poured. At the center 9 of the bar 12, is pivoted a tilting bar 10, with an adjusting screw 5 and lock nut 14, at its outer end, by which the base part 4 can be raised on one side so as to throw the base 4 out of level and get any angle desired. The rest 15, Figs. 1 and 3, holds one side constant while the other side is being raised or lowered by means of the adjusting screw 5. The stops 11, 11', Figs. 1 and 2, limit the pivotal movement of the bar 10.

Measurements are first taken of the dimensions of the beveled flange desired. The size of the flanges to be fitted and the number of bolt holes therein and the spacing being known the proper size mold is selected. The thickness of the beveled flange at its thinnest and at its thickest points are noted and also whether the thickest part comes where there is a bolt hole or between two bolt holes. Suppose the cast beveled filler piece is to be one half inch thick at its thinnest edge and one and one half inches at its thickest edge, with a bolt hole through its thickest part. Then the tilting bar 10 is moved until it is in line with one of the bolt hole pins 7, as shown in Fig. 2. The adjusting screw 5 and its lock nut 14, would be set so that the base 4 would be one inch off level, that is, until the top surface of 4 on the adjusting screw side of the mold was one inch higher than the surface of 4 at its diametrically opposite point. Then the gage screw 6 would be set so that its bottom point was one half inch above the top surface of the base 4 and held at that point by the lock nut 13. The mold is now ready to receive the molten metal, usually lead, and the resulting beveled casting would be one half inch thick at its thinnest edge, inch and one half thick at its thickest point and with the bolt hole also at this point. If the thickest part was to be between two bolt holes, the tilting bar would be set as at 10', Fig. 2, which would bring about the desired result. If the bar 10 is moved until it is against the stop 11, the thickest part of the beveled casting will be in line with the pin 7; if it is moved to the position 10' against the stop 11', the thickest part will be between the two oposite pins 7, 7. In taking the casting from the mold, loosen up the bolts at 3, Fig. 2, which clamp the outer rim 1 to the base 4 and upon upsetting the mold the casting can be readily removed. A mold should be made for each size of standard flange, four, six, eight, ten inch pipe, etc. Having once provided these any beveled filler ring desired can be speedily furnished, without impeding the progress of the work.

I am aware that many changes and alterations can be made in the construction and arrangement of parts herein described, all within the scope of my invention and therefore I do not limit myself to the exact and particular form shown.

I claim,—

1. In a mold of the type described, a circular base part with inner concentric opening, a vertical rim clamped on the periphery of the base part, a vertical rim fitted to the inner opening, vertical pins spaced on the base part between the outer and inner rims, a gage to indicate the depth of molten metal to be poured, and a centrally pivoted bar underneath the mold and extending beyond the outer rim, with an adjusting screw at its outer end.

2. In a mold of the type described, a base part with an inner opening therein, a rim clamped to the perimeter of the base part, a rim fitted to the inner opening, vertical pegs spaced on the base part between the outer and inner rims, a gage to indicate the depth of molten metal to be poured and a pivoted tilting bar with an adjusting screw at its outer end.

3. In a mold of the type described, a base part with rim clamped to its outer edge, a gage to indicate the depth of molten metal to be poured and means for tilting the base part to any desired angle.

4. In a mold of the type described, a circular base part with inner concentric opening, a rim clamped on the periphery of the base part, a rim fitted to the inner opening, vertical pegs spaced on the base part between the outer and inner rims and means for adjusting the base part to any desired angle.

JAMES M. MARK.